United States Patent [19]
Park

[11] Patent Number: 5,928,102
[45] Date of Patent: Jul. 27, 1999

[54] GEARTRAIN FOR A FIVE-SPEED AUTOMATIC TRANSMISSION

[75] Inventor: Jong-sool Park, Suwon-si, Rep. of Korea

[73] Assignee: Hyundai Motor Company, Seoul, Rep. of Korea

[21] Appl. No.: 09/104,703

[22] Filed: Jun. 25, 1998

[30] Foreign Application Priority Data

Oct. 8, 1997 [KR] Rep. of Korea ............ 97-51612

[51] Int. Cl.$^6$ ............................................. F16H 3/44
[52] U.S. Cl. ........................ 475/286; 475/280; 475/271
[58] Field of Search ............................... 475/286, 280, 475/276, 271, 317, 323, 331

[56] References Cited

U.S. PATENT DOCUMENTS

| | | | |
|---|---|---|---|
| 4,027,552 | 6/1977 | Murakami et al. | 475/280 |
| 4,088,043 | 5/1978 | Johnson et al. | 475/286 X |
| 4,143,562 | 3/1979 | Murakami et al. | 475/276 |
| 4,531,428 | 7/1985 | Windish | 475/286 X |
| 4,683,776 | 8/1987 | Klemen | 475/286 |
| 4,744,267 | 5/1988 | Lepelletier | 475/276 |
| 5,246,409 | 9/1993 | Flemming et al. | 475/276 |

*Primary Examiner*—Dirk Wright
*Assistant Examiner*—Peter T. Kwon
*Attorney, Agent, or Firm*—Finnegan, Henderson, Farabow, Garrett & Dunner, L.L.P.

[57] ABSTRACT

A geartrain for a five-speed automatic transmission includes first and second compound planetary gear units. The first compound planetary gear unit includes first and second simple planetary gearsets having first, second, third and fourth operating elements. The first operating element acts as an input element. The second compound planetary gear unit includes third and fourth simple planetary gearsets having fifth, sixth, seventh and eighth operating elements. The fifth operating element acts as an output element and the sixth and eighth operating elements are variably connected to the first and fourth operating elements, respectively. The seventh operating element is fixedly connected to the third operating element. Clutches are provided for variably connecting the sixth and eighth operating elements to the first and fourth operating elements, respectively. Brakes are provided for selectively connecting the second and eighth operating elements to a transmission housing.

38 Claims, 10 Drawing Sheets

FIG. 12

*Friction Element Chart*

| Shift Range \ Friction Element | C1 | C2 | B1 | B2 |
|---|---|---|---|---|
| R |  |  | ○ | ○ |
| D1 | ○ |  | ○ |  |
| D2 | ○ |  |  | ○ |
| D3 | ○ | ○ |  |  |
| D4 |  | ○ |  | ○ |
| D5 |  | ○ | ○ |  |

GEARTRAIN FOR A FIVE-SPEED AUTOMATIC TRANSMISSION

BACKGROUND OF THE INVENTION

1. Field of the Invention

The present invention relates to a geartrain, and more particularly, to a geartrain for a five-speed automatic transmission used in vehicles, which can be designed to be compact in size and lightweight by reducing the number of frictional elements and planetary gearsets.

2. Description of the Related Art

Generally, automatic transmission systems for vehicles comprise a transmission control unit (TCU) which automatically controls shift ratios according to changes in a running condition of the vehicle.

The above-described TCU controls a plurality of friction elements provided in a geartrain to either operative or inoperative states to select one of the three essential elements of the planetary gearset (a sun gear, a ring gear, and a planet carrier) to be an input element, another a reaction element, and the last an output element, thereby controlling the number of output revolutions.

The geartrain is generally designed to realize four forward speeds and one reverse speed. However, with the development of high-power engines, geartrains have been developed to realize five forward speeds and one reverse speed.

The 5-speed geartrain is comprised of three simple planetary gearsets and at least six friction elements.

However, in such a geartrain for a 5-speed automatic transmission, to drive the vehicle in fourth or fifth speed-overdrive, there is a need for an element which rotates at a higher speed than that of a final output element. This results in power loss. In addition, the large number of friction elements results in a heavy and large-size automatic transmission.

SUMMARY OF THE INVENTION

The present invention has been made in an effort to solve the problems associated with the above described conventional geartrain.

It is an object of the present invention to provide a geartrain for a five-speed automatic transmission used in vehicles which, by omitting an element which rotates at a higher speed than a final output element needed in the prior art during overdrive, can minimize power loss.

It is another object of the present invention to provide a geartrain for a five-speed automatic transmission which can be designed to be compact in size and lightweight by reducing the number of friction elements.

According to a feature of the present invention, a geartrain for a five-speed automatic transmission, comprising a first compound planetary gear unit comprising first and second simple planetary gearsets having first, second, third and fourth operating elements, said first operating element acting as an input element; a second compound planetary gear unit comprising third and fourth simple planetary gearsets having fifth, sixth, seventh and eighth operating elements, said fifth operating element acting as an output element, said sixth and eighth operating elements being variably connected to said first and fourth operating elements, respectively, and said seventh operating element being fixedly connected to the third operating element; clutch means for variably connecting said sixth and eighth operating elements to said first and fourth operating elements, respectively; and brake means for selectively connecting the second and eighth operating elements to a transmission housing. Each of said first and second simple planetary gearsets is a single pinion planetary gearset.

According to a first embodiment of the present invention, the first operating element is a combination of a sun gear of the first simple planetary gearset and a sun gear of the second simple planetary gearset; the second operating element is a planet carrier of the first simple planetary gearset; the third operating element is a planet carrier of the second simple planetary gearset; and the fourth operating element is a combination of a ring gear of the first simple planetary gearset and a ring gear of the second simple planetary gearset.

In the first embodiment, each of the third and fourth planetary gearsets is a single pinion planetary gearset.

In the first embodiment, the fifth operating element is a combination of a sun gear of the third simple planetary gearset and a ring gear of the fourth simple planetary gearset; the sixth operating element is a planet carrier of the fourth simple planetary gearset; the seventh operating element is a planet carrier of the third simple planetary gearset and a sun gear of the fourth simple planetary gearset; and the eighth operating element is a ring gear of the third simple planetary gearset.

In the first embodiment, the clutch means comprises a first clutch interposed between the combination of the ring gears of the first and second simple planetary gearsets and the ring gear of the third simple planetary gearset.

In the first embodiment, the brake means comprises a first brake interposed between the planet carrier of the first simple planetary gearset and the transmission housing and a second brake interposed between the ring gear of the third simple planetary gearset and the transmission housing.

According to a second embodiment of the present invention, the first operating element is a sun gear of the first simple planetary gearset; the second operating element is a planet carrier of the first simple planetary gearset; the third operating element is a planet carrier of the second simple planetary gearset; and the fourth operating element is a combination of a ring gear of the first simple planetary gearset and a ring gear and sun gear of the second simple planetary gearset.

In the second embodiment, each of the third and fourth planetary gearsets is a single pinion planetary gearset.

In the second embodiment, the fifth operating element is a combination of a sun gear of the third simple planetary gearset and a ring gear of the fourth simple planetary gearset; the sixth operating element is a planet carrier of the fourth simple planetary gearset; the seventh operating element is a combination of a planet carrier of the third simple planetary gearset and a sun gear of the fourth simple planetary gearset; and the eighth operating element is a ring gear of the third simple planetary gearset.

In the second embodiment, the clutch means comprises a first clutch interposed between the sun gear of the first simple planetary gearset and the planet carrier of the fourth simple planetary gearset, and a second clutch interposed between the combination of the ring gear of the first simple planetary gearset and the ring and sun gears of the second simple planetary gearset and the ring gear of the third simple planetary gearset.

In the second embodiment, the brake means comprises a first brake interposed between the planet carrier of the first simple planetary gearset and the transmission housing and a second brake interposed between the ring gear of the third simple planetary gearset and the transmission housing.

According to a third embodiment of the present invention, the first operating element is a sun gear of the first simple planetary gearset; the second operating element is a combination of a planet carrier of the first simple planetary gearset and a ring gear of the second simple planetary gearset; the third operating element is a planet carrier of the second simple planetary gearset; and the fourth operating element is a combination of a ring gear of the first simple planetary gearset and a sun gear of the second simple planetary gearset.

In the third embodiment, each of the third and fourth planetary gearsets is a single pinion planetary gearset.

In the third embodiment, the fifth operating element is a combination of a sun gear of the third simple planetary gearset and a ring gear of the fourth simple planetary gearset; the sixth operating element is a planet carrier of the fourth simple planetary gearset; the seventh operating element is a combination of a planet carrier of the third simple planetary gearset and a sun gear of the fourth simple planetary gearset; and the eighth operating element is a ring gear of the third simple planetary gearset.

In the third embodiment, the clutch means comprises a first clutch interposed between the sun gear of the first simple planetary gearset and the planet carrier of the fourth simple planetary gearset, and a second clutch interposed between the combination of the ring gear of the first simple planetary gearset and the sun gear of the second simple planetary gearset and the ring gear of the third simple planetary gearset.

In the third embodiment, the brake means comprises a first brake interposed between the combination of the planet carrier of the first simple planetary gearset and the ring gear of the second simple planetary gearset and the transmission housing, and a second brake interposed between the ring gear of the third simple planetary gearset and the transmission housing.

According to a fourth embodiment, the first operating element is a sun gear of the second simple planetary gearset; the second operating element is a ring gear of the first simple planetary gearset; the third operating element is a combination of a planet carrier of the first simple planetary gearset and a planet carrier of the second simple planetary gearset; and the fourth operating element is a combination of a sun gear of the first simple planetary gearset and a ring gear of the second simple planetary gearset.

In the fourth embodiment, each of the third and fourth planetary gearsets is a single pinion planetary gearset.

In the fourth embodiment, the fifth operating element is a combination of a sun gear of the third simple planetary gearset and a ring gear of the fourth simple planetary gearset; the sixth operating element is a planet carrier of the fourth simple planetary gearset; the seventh operating element is a combination of a planet carrier of the third simple planetary gearset and a sun gear of the fourth simple planetary gearset; and the eighth operating element is a ring gear of the third simple planetary gearset.

In the fourth embodiment, the clutch means comprises a first clutch interposed between the sun gear of the second simple planetary gearset and the planet carrier of the fourth simple planetary gearset, and a second clutch interposed between the combination of the sun gear of the first simple planetary gearset and the ring gear of the second simple planetary gearset and the ring gear of the third simple planetary gearset.

In the fourth embodiment, the brake means comprises a first brake interposed between the ring gear of the first simple planetary gearset and the transmission housing, and a second brake interposed between the ring gear of the third simple planetary gearset and the transmission housing.

According to a fifth embodiment, the first simple planetary gearset is a single pinion planetary gearset and the second simple planetary gearset is a double pinion planetary gearset.

In the fifth embodiment, the first operating element is a sun gear of the first simple planetary gearset; the second operating element is a combination of a planet carrier of the first simple planetary gearset and a planet carrier of the second simple planetary gearset; the third operating element is a ring gear of the second simple planetary gearset; and the fourth operating element is a combination of a ring gear of the first simple planetary gearset and a sun gear of the second simple planetary gearset.

In the fifth embodiment, each of the third and fourth planetary gearsets is a single pinion planetary gearset.

In the fifth embodiment, the fifth operating element is a combination of a sun gear of the third simple planetary gearset and a ring gear of the fourth simple planetary gearset; the sixth operating element is a planet carrier of the fourth simple planetary gearset; the seventh operating element is a combination of a planet carrier of the third simple planetary gearset and a sun gear of the fourth simple planetary gearset; and the eighth operating element is a ring gear of the third simple planetary gearset.

In the fifth embodiment, the clutch means comprises a first clutch interposed between the sun gear of the first simple planetary gearset and the planet carrier of the fourth simple planetary gearset, and a second clutch interposed between the combination of the ring gear of the first simple planetary gearset and the sun gear of the second simple planetary gearset and the ring gear of the third simple planetary gearset.

In the fifth embodiment, the brake means comprises a first brake interposed between the combination of the planet carrier of the first simple planetary gearset and the planet carrier of the second simple planetary gearset and the transmission housing, and a second brake interposed between the ring gear of the third simple planetary gearset and the transmission housing.

According to a sixth embodiment, the first operating element is a sun gear of the first simple planetary gearset; the second operating element is a planet carrier of the second simple planetary gearset; the third operating element is a combination of a planet carrier of the first simple planetary gearset and a ring gear of the second simple planetary gearset; and the fourth operating element is a combination of a ring gear of the first simple planetary gearset and a sun gear of the second simple planetary gearset.

In the sixth embodiment, each of the third and fourth planetary gearsets is a single pinion planetary gearset.

In the sixth embodiment, the fifth operating element is a combination of a sun gear of the third simple planetary gearset and a ring gear of the fourth simple planetary gearset; the sixth operating element is a planet carrier of the fourth simple planetary gearset; the seventh operating element is a combination of a planet carrier of the third simple planetary gearset and a sun gear of the fourth simple planetary gearset; and the eighth operating element is a ring gear of the third simple planetary gearset.

In the sixth embodiment, the clutch means comprises a first clutch interposed between the sun gear of the first simple planetary gearset and the planet carrier of the fourth simple planetary gearset, and a second clutch interposed between the combination of the ring gear of the first simple planetary gearset and the sun gear of the second simple planetary gearset and the ring gear of the third simple planetary gearset.

In the sixth embodiment, the brake means comprises a first brake interposed between the planet carrier of the second simple planetary gearset and the transmission housing, and a second brake interposed between the ring gear of the third simple planetary gearset and the transmission housing.

According to a seventh embodiment of the present invention, the first operating element is a combination of a sun gear of the first simple planetary gearset and a sun gear of the second simple planetary gearset; the second operating element is a ring gear of the first simple planetary gearset; the third operating element is a planet carrier of the second simple planetary gearset; and the fourth operating element is a combination of a planet carrier of the first simple planetary gearset and a ring gear of the second simple planetary gearset.

In the seventh embodiment, each of the third and fourth planetary gearsets is a single pinion planetary gearset.

In the seventh embodiment, the fifth operating element is a combination of a sun gear of the third simple planetary gearset and a ring gear of the fourth simple planetary gearset; the sixth operating element is a planet carrier of the fourth simple planetary gearset; the seventh operating element is a combination of a planet carrier of the third simple planetary gearset and a sun gear of the fourth simple planetary gearset; and the eighth operating element is a ring gear of the third simple planetary gearset.

In the seventh embodiment, the clutch means comprises a first clutch interposed between the combination of the sun gear of the first simple planetary gearset and the planet carrier of the fourth simple planetary gearset, and a second clutch interposed between the combination of the planet carrier of the first simple planetary gearset and the ring gear of the second simple planetary gearset and the ring gear of the third simple planetary gearset.

In the seventh embodiment, the brake means comprises a first brake interposed between the ring gear of the second simple planetary gearset and the transmission housing, and a second brake interposed between the ring gear of the third simple planetary gearset and the transmission housing.

BRIEF DESCRIPTION OF THE DRAWINGS

The accompanying drawings, which are incorporated in and constitute a part of the specification, illustrate an embodiment of the invention, and, together with the description, serve to explain the principles of the invention:

FIG. 12 is a chart illustrating the operation of friction elements in each shift range of a power train according to a preferred embodiment of the present invention.

DESCRIPTION OF THE PREFERRED EMBODIMENTS

Preferred embodiments of the present invention will now be described in detail with reference to the accompanying drawings.

First Embodiment

Figure 1:
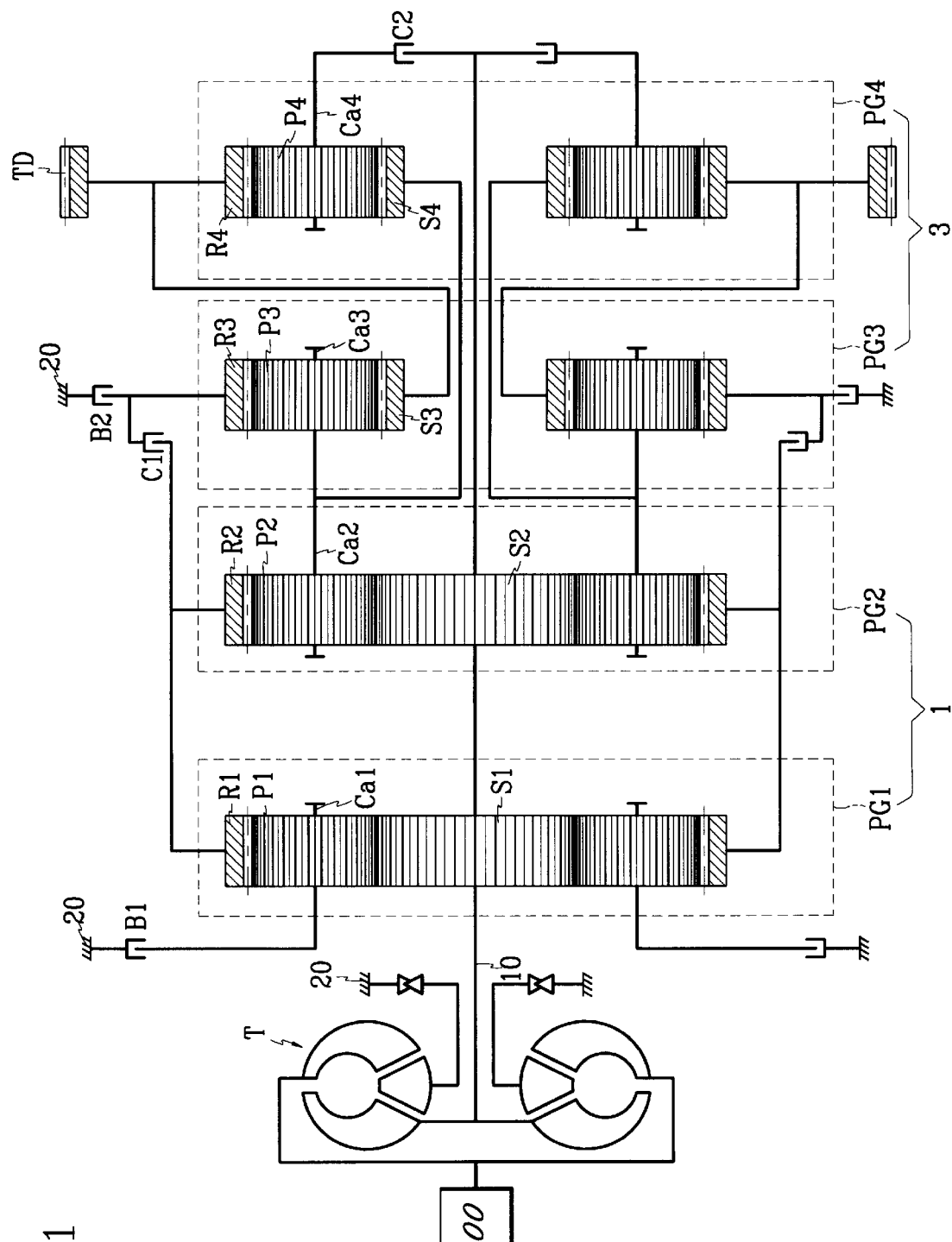
FIG. 1 is a schematic diagram illustrating a geartrain according to a first embodiment of the present invention.

Referring first to FIG. 1, there is shown a schematic diagram of a geartrain according to a first embodiment of the present invention.

The geartrain of this embodiment comprises an engine 100 for generating power, a torque converter T for multiplying torque generated from the engine 100, and first and second compound planetary gear units 1 and 3 for receiving converted torque through an input shaft 10 and for outputting five forward speeds and one reverse speed to a transfer drive gear TD.

The first planetary gear unit 1 comprises first and second simple planetary gearsets PG1 and PG2 each of which is a single pinion planetary gearset.

In the first compound planetary gear unit 1, a sun gear S1 of the first simple planetary gearset PG1 is fixedly connected to a sun gear S2 of the second simple planetary gearset PG2, and a ring gear R1 of the first simple planetary gearset PG1 is fixedly connected to a ring gear R2 of the second simple planetary gearset PG2.

Therefore, the first compound planetary gear unit 1 consists of four operating elements, i.e., a planet carrier Ca1, connecting pinion gears P1 to each other, of the first simple planetary gearset PG1, a planet carrier Ca2, connecting pinion gears P2 to each other, of the second simple planetary gearset PG2, a combination of the sun gears S1 and S2 of the first and second simple planetary gearsets PG1 and PG2, and a combination of the ring gear R1 and R2 of the first and second simple planetary gearsets PG1 and PG2.

The combination of the sun gears S1 and S2 is fixedly mounted around the input shaft 10 to act as an input element. The planet carrier Ca1 is variably connected to a transmission housing 20 to selectively act as a reacting element.

The second compound planetary gear unit 3 comprises third and fourth simple planetary gearsets PG3 and PG4 each of which is a single pinion planetary gearset.

In the second compound planetary gear unit 3, a sun gear S3 of the third simple planetary gearset PG3 is fixedly connected to a ring gear R4 of the fourth simple planetary gearset PG4, and a planet carrier Ca3, connecting pinion gears P3 to each other, of the third simple planetary gearset PG3 is fixedly connected to a sun gear S4 of the fourth simple planetary gearset PG4.

Therefore, the second compound planetary gear unit 3 consists of four operating elements, i.e., a ring gear R3 of the third simple planetary gearset PG3, a planet carrier Ca4 of the fourth simple planetary gearset PG4, a combination of the sun gear S3 and ring gear R4, and a combination of the planet carrier Ca3 and the sun gear S4.

The ring gear R3 of the third simple planetary gearset PG3 is variably connected to the transmission housing 20 to selectively act as a reacting element.

The above described first and second compound planetary gear units 1 and 3 are combined to each other. That is, the combination of the sun gears S1 and S2 of the first and second simple planetary gearsets PG1 and PG2 is variably connected to the planet carrier Ca4 of the fourth simple planetary gearset PG4; the combination of the ring gears R1 and R2 of the first and second simple planetary gearsets PG1 and PG2 is variably connected to the ring gear R3 of the third simple planetary gearset PG3; and the planet carrier Ca2 of the second simple planetary gearset PG2 is fixedly connected to the combination of the planet carrier Ca3 and sun gear S4 of the third and fourth simple planetary gearsets PG3 and PG4. The combination of the sun gear S3 and ring gear R4 of the third and fourth simple planetary gearsets PG3 and PG4 is connected to the transfer drive gear TD to act as an output element.

A first clutch C1 is interposed between the combination of the ring gears R1 and R2 of the first and second simple planetary gearsets PG1 and PG2 and the ring gear R3 of the third simple planetary gearset PG3. The first clutch C1 is operated in forward first, second and third speeds to connect the combination of the ring gears R1 and R2 to the ring gear R3. A second clutch C2 is interposed between the combination of the sun gears S1 and S2 of the first and second simple planetary gearsets PG1 and PG2 and the planet carrier Ca4 of the fourth simple planetary gearset PG4. The second clutch C2 is operated in forward third, fourth and fifth speeds to connect the combination of the sun gears S1 and S2 to the planet carrier Ca4 so that the planet carrier Ca4 acts as an input element.

In addition, a first brake B1 is interposed between the planet carrier R1 of the first simple planetary gearset PG1 and the transmission housing 20. The first brake B1 is engaged to fix the planet carrier R1 in forward first and fifth speeds and reverse speed. A second brake B2 is interposed between the ring gear R3 of the third simple planetary gearset PG3 and the transmission housing 20, such that it can operate in the forward second and fourth speeds and the reverse speed to fix the ring gear R3.

Figure 8:
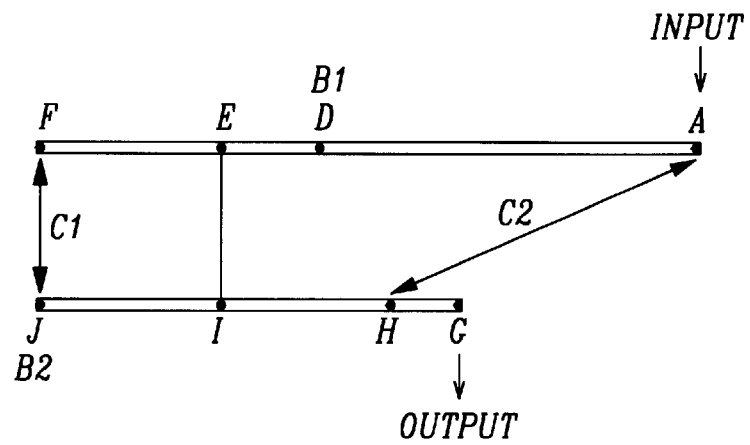
FIG. 8 is a lever analogy representation which can be obtained through geartrains according to various embodiments of the present invention depicted in FIGS. 1–7.

The above described geartrain can be illustrated as a lever representation as shown in FIG. 8. In FIG. 8, levers L1 and L2 indicate the first and second compound planetary gear units 1 and 3, respectively. The four operating elements of the first compound planetary gear units 1 are indicated as first, second, third and fourth operating elements A, D, E and F on the first lever L1, and the four operating elements of the second compound planetary gear unit 3 are indicated as first, second, third and fourth operating elements G, H, I and J on the second lever L2.

Describing the first lever L1 more in detail, the first operating element A indicates the combination of the sun gears S1 and S2 of the first and second simple planetary gearsets PG1 and PG2, the second operating element D indicates the planet carrier Ca1 of the first simple planetary gearset PG2, the third operating element E indicates the planet carrier Ca2 of the second simple planetary gearset PG2, and the fourth operating element F indicates the combination of the ring gears R1 and R2 of the first and second simple planetary gearsets PG1 and PG2.

In addition, in the second lever L2, the first operating element G indicates the combination of the sun gear S3 and ring gear R4 of the third and fourth simple planetary gearsets PG3 and PG4, and the second operating element H indicates the planet carrier Ca4 of the fourth simple planetary gearset PG4. The third operating element I indicates the combination of the planet carrier Ca3 and sun gear S4 of the third and fourth simple planetary gearsets PG3 and PG4, and the fourth operating element J indicates the ring gear R3 the third simple planetary gearset PG3.

In the first lever L1, as described above, the first operating element A is fixed on the input shaft 10 to act as an input element, and the second operating element D is variably connected to the transmission housing 20 by the first brake B1 to selectively act as a reacting element.

In the second lever L2, the first operating element G is connected to the transfer drive gear TD to act as an output element, and the fourth operating element J is variably connected to the transmission housing 20 by the second brake B2 to selectively act as a reacting element.

The first clutch C1 is interposed between the fourth operating element F of the first lever L1 and the fourth operating element J of the second lever L2 to selectively interconnect the operating elements F and J. The second clutch C2 is interposed between the first operating element A of the first lever L1 and the second operating element H of the second lever L2 to interconnect the operating elements A and H.

Figure 9:
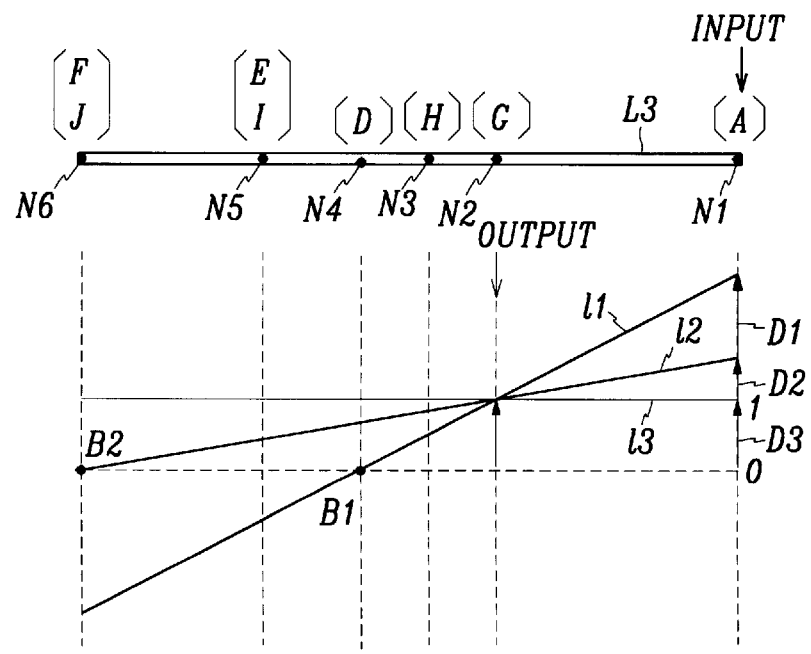
FIG. 9 is a schematic diagram illustrating an operation of forward first, second and third speeds of a geartrain according to a preferred embodiment of the present invention through a lever analogy.

In the forward first, second and third speeds D1, D2 and D3, since the first clutch C1 is operated as charted in FIG. 12, the lever representation of FIG. 8 can be illustrated as a single third lever L3 having first, second, third, fourth, fifth and sixth nodes N1, N2, N3, N4, N5 and N6 as shown in FIG. 9.

That is, in the third lever L3, the first node N1 indicates the first operating element A of the first compound planetary gear unit 1, the second node N2 indicates the first operating element G of the second compound planetary gear unit 3, the third node N3 indicates the second operating element H of the second compound planetary gear unit 3, the fourth node N4 indicates the second operating element D of the first compound planetary gear unit 3, the fifth node N5 indicates the combination of the third operating elements E and I of the first and second compound planetary gear units 1 and 3, and the sixth node N6 indicates the fourth operating elements F and J of the first and second compound planetary gear units 1 and 3.

That is, the first node N1 indicates the combination of the sun gears S1 and S2 of the first and second simple planetary gearsets PG1 and PG2, the second node N2 indicates the combination of the sun gear S3 and ring gear R4 of the third and fourth simple planetary gearsets PG3 and PG4, the third node N3 indicates the planet carrier Ca4 of the fourth simple planetary gearset PG4, the fourth node N4 indicates the planet carrier Ca1 of the first simple planetary gearset PG1, the fifth node N5 indicates the combination of the planet carriers Ca2 and Ca3 and sun gear S4 of the second, third and fourth simple planetary gearsets PG2, PG3 and PG4, and the sixth node N6 indicates the ring gears R1, R2 and R3 of the first, second and third simple planetary gearsets PG1, PG2 and PG3.

Through this lever analogy, shift ratios of the forward first, second and third speeds can be demonstrated.

FORWARD FIRST SPEED

In the forward first speed D1, the first clutch C1 and the first brake B1 are operated as charted in FIG. 12. Accordingly, the first node N1 indicating the first operating element A of the first lever L1 becomes the input element, and the fourth node N4 indicating the second operating element D of the first lever L1 becomes a reacting element. Accordingly, the first forward speed is outputted through the second node N2 indicating the first operating element G of the second lever L2.

Namely, the combination of the sun gears S1 and S2 of the first and second simple planetary gearsets PG1 and PG2 becomes the input element, the planet carrier Ca1 of the first simple planetary gearset PG1 becomes the reacting element. The combination of the sun gear S3 and ring gear R4 of the third and fourth simple planetary gearsets PG3 and PG4 becomes the output element.

Therefore, when assuming that the output revolution numgber of the combination of the sun gear S3 and ring gear R4 is "1", a line connecting the output point of the second node N2, acting as the output element, to the fourth node N4, acting as the reacting element, becomes the first speed line 11. At this point, the number of input revolution D1 of the first node N1 becomes the first input speed which is higher than the output speed "1". This shows that speed reduction is realized.

In the first speed state, the element of the third node N3 rotates in the output direction at a number of revolutions less than that of the output, while the elements in the fifth and sixth nodes N5 and N6 rotate in the opposite direction of the output.

FORWARD SECOND SPEED

If throttle opening is increased in the forward first speed state, the first brake B1 is disengaged, while the second brake B2 is operated as charted in FIG. 12. Accordingly, the reacting element is changed from the fourth node N4 to the sixth node N6 indicating the combination of the fourth operating elements F and J of the first and second levers L1 and L3.

Namely, the combination of the sun gears S1 and S2 of the first and second simple planetary gearsets PG1 and PG2 becomes the input element, the ring gear R3 of the third simple planetary gearset PG3 becomes the reacting element. The combination of the sun gear S3 and ring gear R4 of the third and fourth simple planetary gearsets PG3 and PG4 becomes the output element.

That is, when the output revolution number of the combination of the sun gears is assumed to be "1", a line connecting the output speed point of the second node N2, acting as an output element, to the sixth node N6, acting as the reacting element, becomes the second speed line 12. At this point, the number of input revolution D2 of the first node N1 becomes the second input speed which is higher than the output speed "1". This shows that speed reduction is realized.

In this forward second speed state, all operating elements of the third, fourth and fifth nodes N3, N4 and N5 rotate in the output direction at a number of revolutions less than that of the output.

FORWARD THIRD SPEED

If the throttle opening is increased in the forward second speed state, the second brake B2 is released, while the second clutch C2 is operated as charted in FIG. 12. Accordingly, since the first and second compound planetary gear units 1 and 3 are locked as the input is realized through the first node N1, the forward third speed is outputted through the second node N2 indicating the first operating element G of the second lever L2.

That is, in a state where the input is realized through first node N1, since the first and second compound planetary gear units 1 and 3 are locked, the third speed is outputted through the transfer drive gear TD fixed to the second node N2 indicating the combination of the sun gear S3 and ring gear R4 of the third and fourth simple planetary gearsets PG3 and PG4.

That is, when assuming that the output revolution number of the combination of the sun gear S3 and ring gear R4 is "1", a line connecting the output speed point of the second node N2 to the equal level of the first node N1, acting as the input element, becomes the third speed line 13. At this point, the number of input revolution of the first node N1 becomes the third input speed D3 which is equal to that of the output speed "1". This shows that neither speed reduction nor speed increase occurs.

In this forward third speed state, all operating elements of the nodes N1 through N6 rotate in the output direction at the same number of revolutions as that of the output.

[Forward Fourth and Fifth Speeds]

Figure 10:
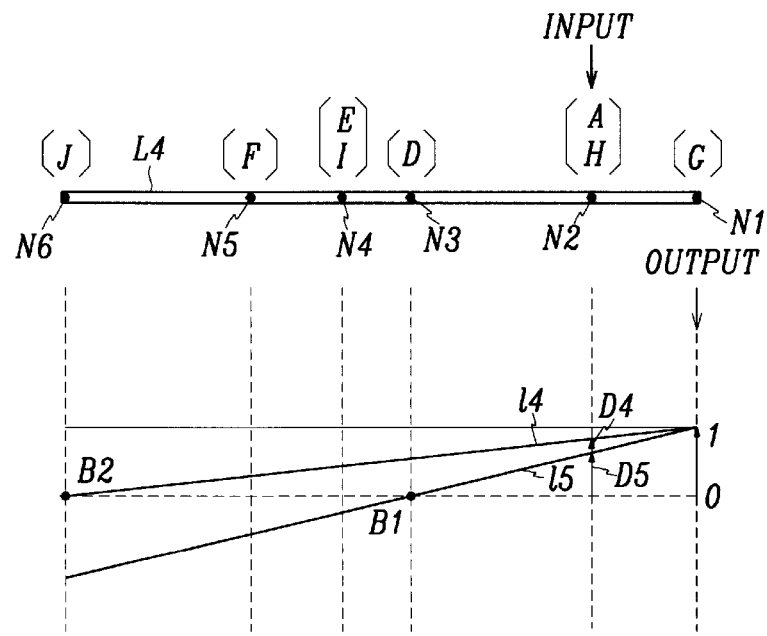
FIG. 10 is a schematic diagram illustrating an operation of forward fourth and fifth speeds of a geartrain according to a preferred embodiment of the present invention through a lever analogy diagram.
Figure 11:
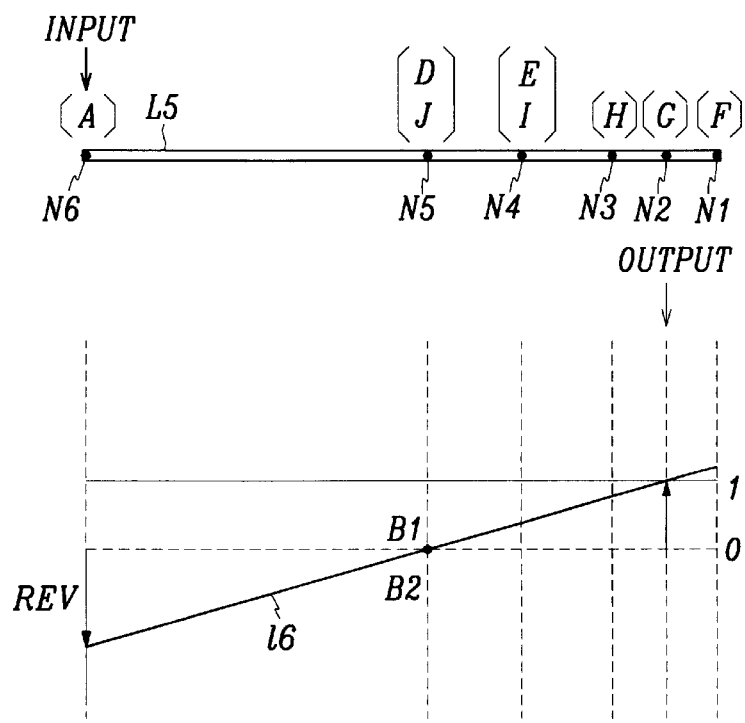
FIG. 11 is a schematic diagram illustrating an operation of reverse speed of a geartrain according to a preferred embodiment of the present invention through a lever analogy diagram.

In the forward fourth and fifth speeds, since the second clutch C2 is operated as charted in FIG. 12, the first and second levers L1 and L2 can be illustrated as a single fourth lever L4 having first through sixth nodes N1, N2, N3, N4, N5 and N6 as shown in FIG. 10.

That is, in the fourth lever L4, the first node N1 indicates the first operating element G of the second compound planetary gear unit 3, the second node N2 indicates a combination of the first operating element A of the first compound planetary gear unit 1 and the second operating element H of the second compound planetary gear unit 3, the third node N3 indicates the second operating element D of the first compound planetary gear unit 1, the fourth node N4 indicates a combination of the third operating elements E and I of the first and second compound planetary gear units 1 and 3, the fifth node N5 indicates the fourth operating element F of the first compound planetary gear unit 1, and the sixth node N6 denotes the fourth operating element J of the second compound planetary gear unit 3.

That is, the first node N1 indicates the combination of the sun gear S3 and ring gear R4 of the third and fourth simple planetary gearsets PG3 and PG4, the second node N2 indicates the combination of the sun gears S1 and S2 and planet carrier Ca4 of the first, second and fourth simple planetary gearsets PG1, PG2 and PG4, the third node N3 indicates the planet carrier Ca1 of the first simple planetary gearset PG1, the fourth node N4 indicates the planet carriers Ca2 and Ca3 and sun gear S4 of the second, third and fourth simple planetary gearsets PG2, PG3 and PG4, the fifth node N5 indicates the combination of the ring gears R1 and R2 of the first and second simple planetary gearsets PG1 and PG2, and the sixth node N6 indicates the ring gear R3 of the third simple planetary gearset PG3.

Through this lever analogy, shift ratios of the forward fourth and fifth speeds can be demonstrated.

FORWARD FOURTH SPEED

If the throttle opening is increased in the third speed state, the first clutch C1 is disengaged, while the second brake B2 is operated as charted in FIG. 9. Accordingly, the second node N2 indicating the combination of the first operating element A of the first compound planetary gear unit 1 and the second operating element H of the second compound planetary gear unit 3 becomes an input element, while the sixth node N6 indicating the fourth operating element J of the second compound planetary gear unit 3 becomes a reacting element. Therefore, the forward fourth speed is outputted through the first node N1 indicating the first operating element G of the second compound planetary gear unit 3.

Namely, the input element becomes the combination of the sun gears S1 and S2 and planet carrier Ca4 of the first, second and fourth simple planetary gearsets PG1, PG2 and PG4, and the reacting element becomes the ring gear R3 of the third simple planetary gearset PG3. Accordingly, the forward fourth speed is outputed through the transfer drive gear TD fixed to the first node N1 indication the combination of the sun gear S3 and the ring gear R4 of the third and fourth simple planetary gearsets PG3 and PG4.

That is, when assuming that the output revolution number of the combination of the sun gear S3 and ring gear R4 is "1", a line connecting the output speed point of the first node N1 to the sixth node N6, acting as the reacting element, becomes a fourth speed line 14. At this point, the number of input revolution D4 of the second node N2 becomes the fourth input speed which is less than the output speed "1". This shows that speed increase is realized. That is, the fourth speed state is an overdrive in which output speed is higher than the input speed.

In the fourth speed state, all the operating elements of the third, fourth and fifth nodes N3, N4 and N5 rotate in the output direction at the number of revolutions less than that of the output. Therefore, since there is no operating element which idles at a number of revolutions higher than that of output, power loss is prevented.

FORWARD FIFTH SPEED

If the throttle opening is increased in the fourth speed state, the second brake B2 is disengaged, while the first brake B1 is engaged. Accordingly, the second node N2 becomes the input element, while the third node N3 indicating the second operating element D of the first lever L1 becomes the reacting element. In addition, the first node N1 indicating the first operating element G of the second compound planetary gear unit 3 becomes the output element.

That is, the input element becomes a combination of the sun gears S1 and S2 and planet carrier Ca4 of the first, second and fourth simple planetary gearsets PG1, PG2 and PG4. The reacting element becomes the third node N3 indicating the planet carrier Ca1 of the first simple planetary gearset PG1. Therefore, the forward fifth speed is outputted through the transfer drive gear TD fixed to the first node N1 indication the combination of the sun gear S3 and ring gear R4 of the third and fourth simple planetary gearsets PG3 and PG4.

That is, when the output revolution number of the combination of the sun gear S3 and ring gear R4 is assumed to be "1", a line connecting the output speed point of the first node N1 to the third node N3, acting as the reacting element, becomes a fifth speed line 15. At this point, the number of input revolution D5 of the second node N2 becomes the fifth input speed which is less than the output speed "1". This shows that speed increase is realized. That is, the fifth speed state is an overdrive state in which the output speed is higher than the input speed.

In the fifth speed state, the operating elements of the fourth, fifth and sixth nodes N4, N5 and N6 rotate in the opposition direction of the output direction. Therefore, since the third node N3 is fixed, that is, there is no operating element which idles at the number of revolutions higher than that of output, power loss is prevented.

REVERSE SPEED

When a shift mode is selected in a reverse mode, the first and second clutches C1 and C2 are disengaged, and the first and second brakes B1 and B2 are operated.

Accordingly, in the reverse mode, the first and second levers L1 and L2 can be illustrated as a single lever L5 having first through sixth nodes N1 through N6 as shown in FIG. 12.

That is, in the fifth lever L5, the first node N1 indicates the fourth operating element F of the first compound planetary gear unit 1, the second node N2 indicates the first operating element G of the second compound planetary gear unit 3, the third node N3 indicates the second operating element H of the second compound planetary gear unit 3, the fourth node N4 indicates a combination of the third operating elements E and I of the first and second compound planetary gear units 1 and 3, the fifth node N5 denotes the second and fourth operating elements D and J of the first and third compound planetary gear units 1 and 3, and the sixth node N6 indicates the first operating element A of the first compound planetary gear unit 1.

That is, the first node N1 indicates the combination of the ring gears R1 and R2 of the first and second simple planetary gearsets PG1 and PG2, the second node N2 indicates the combination of the sun gear S3 and ring gear R4 of the third and fourth simple planetary gearsets PG3 and PG4, the third node N3 indicates the planet carrier Ca4 of the fourth simple planetary gearset PG4, the fourth node N4 indicates a combination of the planet carriers Ca2 and Ca3 and sun gear S4 of the second, third and fourth simple planetary gearsets PG2, PG3 and PG4, the fifth node N5 indicates the planet carrier Ca1 and ring gear R3 of the first and third simple planetary gearsets PG1 and PG3, and the sixth node N6 indicates the sun gears S1 and S2 of the first and second simple planetary gearsets PG1 and PG2.

Through this lever analogy, the reverse speed can be demonstrated.

In the reverse mode, the first and second clutches C1 and C2 are disengaged, while the first and second brakes B1 and B2 are operated. Accordingly, the sixth node N6 indicating the first operating element A of the first compound planetary gear unit 1 becomes the input element, while both the second operating element D of the first compound planetary gear unit 1 and the fourth operating element J of the second compound planetary gear unit 3 becomes the reacting elements. In addition, the second node N2 indicating the first operating element G of the second compound planetary gear unit 3 becomes the output element.

That is, the combination of the sun gears S1 and S2 becomes the input element, while both the planet carrier Ca1 and the ring gear R3 act as a reacting element. Therefore, the reverse speed is outputted through the transfer drive gear TD fixed to the second node N2 indicating the combination of the sun gear S3 and ring gear R4 of the third and fourth planetary gearsets PG3 and PG4.

That is, when assuming that the output revolution number of the combination of the sun gear S3 and ring gear R4 is "1", a line connecting the output speed point of the first node N2, acting as an output element, to the fifth node N5, acting as the reacting element, becomes the reverse speed line 16. At this point, the number of input revolution REV of the sixth node N6 becomes the reverse input speed. That is, the direction of the input speed is opposite to the output speed.

Second Embodiment

Figure 2:
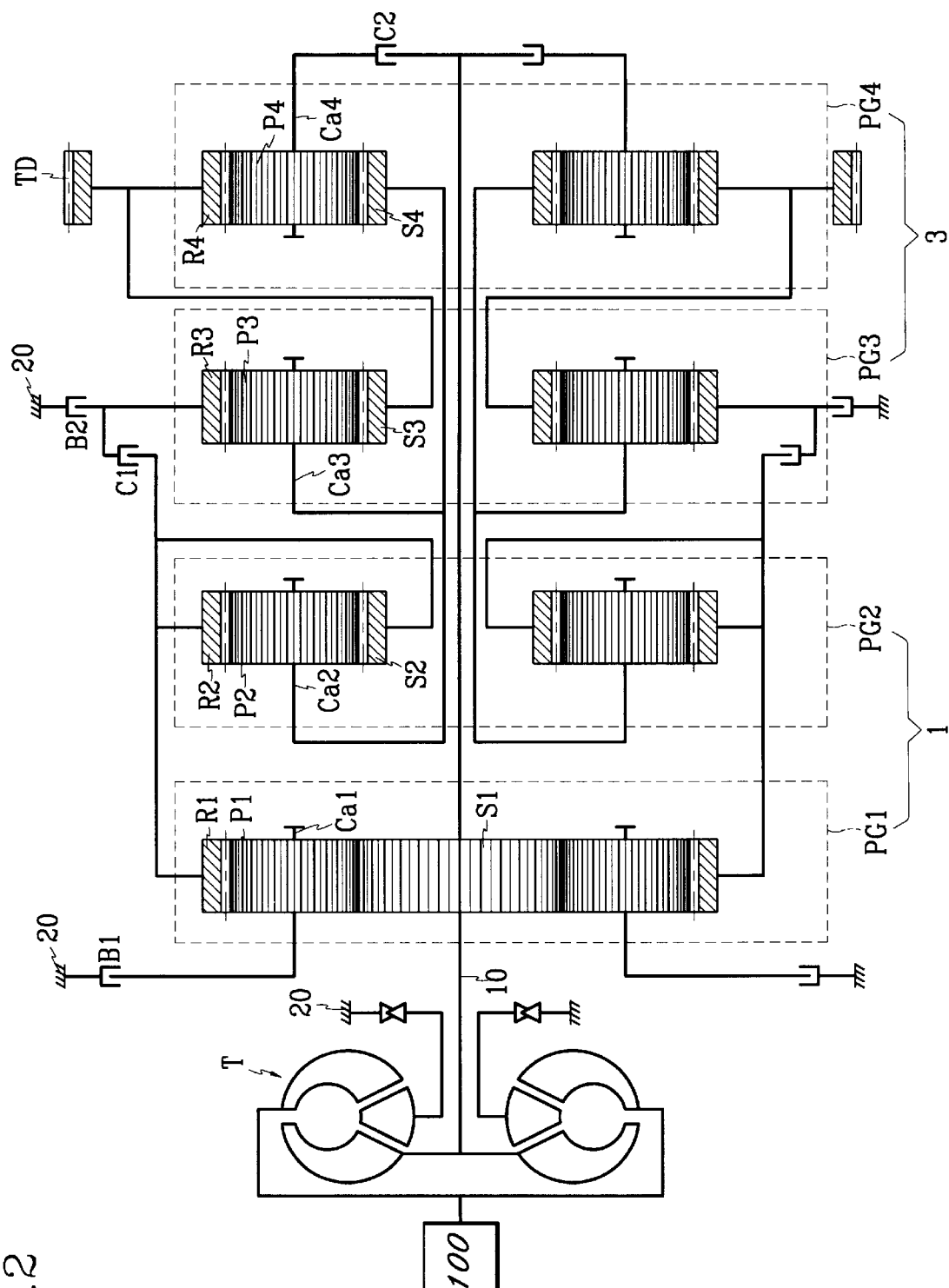
FIG. 2 is a schematic diagram illustrating a geartrain according to a second embodiment of the present invention.

Referring to FIG. 2, there is shown a schematic diagram of a geartrain according to a second embodiment of the present invention.

The geartrain of this embodiment comprises an engine 100 for generating power, a torque converter T for multiplying torque generated from the engine 100, and first and second compound planetary gear units 1 and 3 for receiving converted torque through an input shaft 10 and for outputting five forward speeds and one reverse speed to a transfer drive gear TD.

In this embodiment, the first compound planetary gear unit 1 comprises first and second planetary gearsets PG1 and PG2 each of which is a single pinion planetary gearset. The second compound planetary gear unit 3 comprises third and fourth simple planetary gearsets PG3 and PG4 each of which is a single planetary gearset.

In the first compound planetary gear unit 1, a ring gear R1 of the first simple planetary gearset PG1 is fixedly connected both ring and sun gears R2 and S2 of the second simple planetary gearset PG2.

Therefore, the first compound planetary gear unit 1 consists of four operating elements, i.e., a sun gear S1 of the first simple planetary gearset PG1, a planet carrier Ca1 of the first simple planetary gearset PG1, a planet carrier Ca2 of the second simple planetary gearset PG2, and a combination of the ring gear of the first simple planetary gearset PG1 and the ring gear R2 and sun gear S2 of the second simple planetary gearset PG2.

Since the structure of the second compound planetary gear unit 3 is the same as that of the first embodiment, the detailed description thereof will be omitted and incorporated herein as a reference.

The above described first and second compound planetary gear units 1 and 3 are combined to each other. That is, the planet carrier Ca2 of the second simple planetary gearset PG1 is fixedly connected to the combination of the planet carrier Ca3 and sun gear S4 of the third and fourth simple planetary gearsets PG3 and PG4; the combination of the ring gear R1 of the first simple planetary gearset PG1 and the ring gear R2 and sun gear S2 of the second simple planetary gearsets PG1 and PG2 is variably connected to the ring gear R3 of the third simple planetary gearset PG3; and the sun gear S1 of the first simple planetary gearset PG1 is variably connected to the combination of the planet carrier Ca4 of the fourth simple planetary gearset PG4. In addition, the combination of the sun gear S3 and ring gear R4 of the third and fourth simple planetary gearsets PG3 and PG4 is fixed to the transfer drive gear TD.

A first clutch C1 is interposed between the combination of the ring gear R1 of the first simple planetary gearset PG1 and the ring gear R2 and sun gear S2 of the second simple planetary gearset PG2, and the ring gear R3 of the third simple planetary gearset PG3. The first clutch C1 is operated in forward first, second and third speeds to connect the combination of the ring gear R1 of the first simple planetary gearset PG1 and the ring gear R2 and sun gear S2 of the second simple planetary gearset PG2 to the ring gear R3 of the third simple planetary gearset PG3. A second clutch C2 is interposed between the sun gear S1 of the first simple planetary gearset PG1 and the planet carrier Ca4 of the fourth simple planetary gearset PG4. The second clutch C2 is operated in forward third, fourth and fifth speeds to connect the sun gear S1 to the planet carrier Ca4.

In addition, a first brake B1 is interposed between the planet carrier Ca1 of the first simple planetary gearset PG1 and the transmission housing 20. The first brake B1 is engaged to fix the planet carrier Ca1 in forward first and fifth speeds and reverse speed. A second brake B2 is interposed between the ring gear R3 of the third simple planetary gearset PG3 and the transmission housing 20, such that it can operate in the forward second and fourth speeds and the reverse speed to fix the ring gear R3.

The above described geartrain can be illustrated as a lever representation as shown in FIG. 8. In FIG. 8, levers L1 and L2 indicate the first and second compound planetary gear units 1 and 3, respectively. The four operating elements of the first compound planetary gear units 1 are indicated as first, second, third and fourth operating elements A, D, E and F on the first lever L1, and the four operating elements of the second compound planetary gear unit 3 are indicated as first, second, third and fourth operating elements G, H, I and J on the second lever L2.

In the first lever L1, the first operating element A indicates the sun gear S1 of the first simple planetary gearset PG1, the second operating element D indicates the planet carrier Ca1 of the first simple planetary gearset PG1, the third operating element E indicates the planet carrier Ca2 of the second simple planetary gearset PG2, and the fourth operating element F indicates the combination of the ring gear R1 of the first simple planetary gearset PG1 and the ring gear R2 and sun gear S2 of the second simple planetary gearset PG2.

Since the operating elements of the second lever L2 are the same as those of the first embodiment, the detailed description thereof will be omitted and incorporated herein as a reference.

The detailed description of shift ratios through the lever analogy will be omitted herein as the shift ratios are the same as those of the first embodiment.

Third Embodiment

Figure 3:
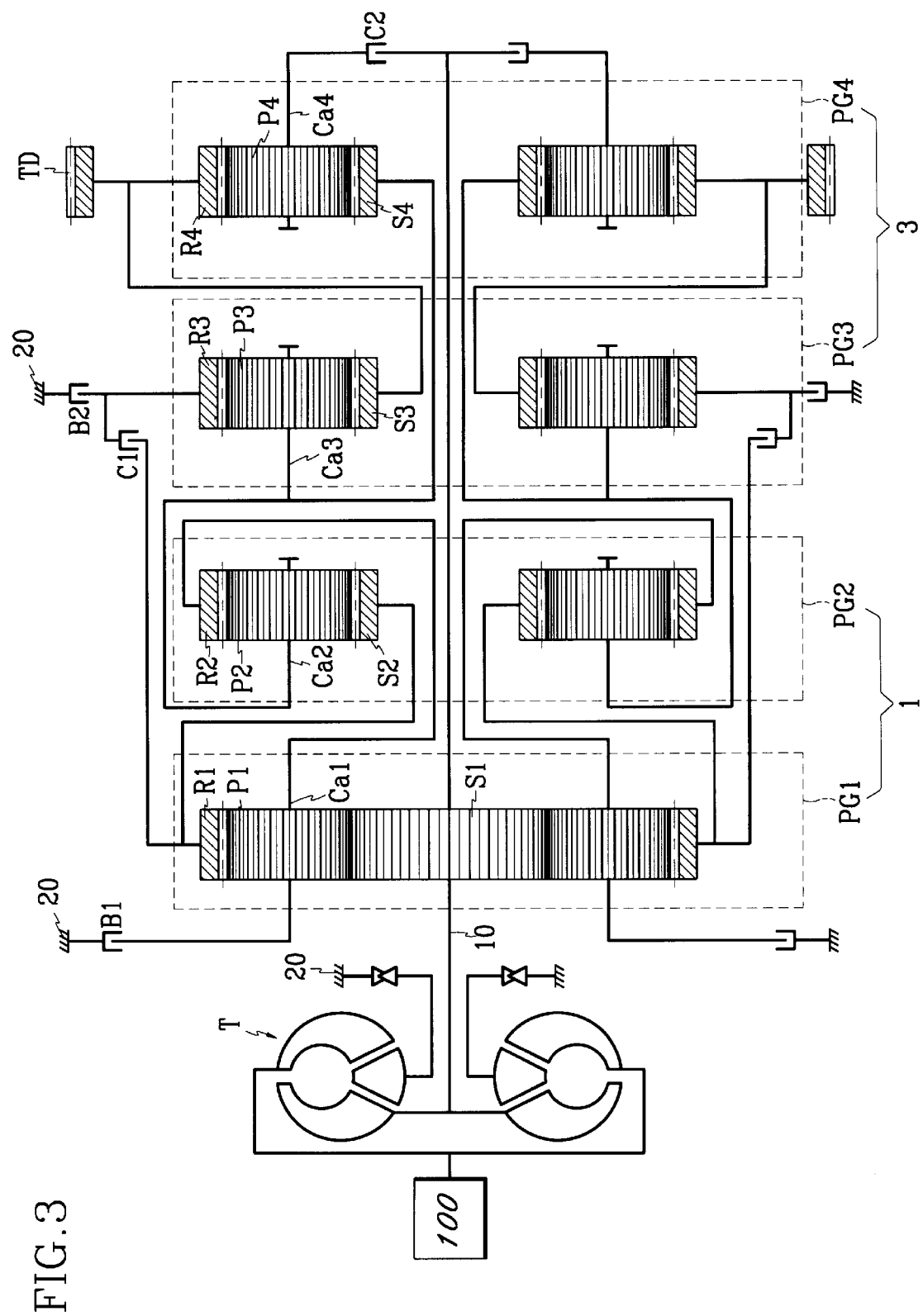
FIG. 3 is a schematic diagram illustrating a geartrain according to a third embodiment of the present invention.

Referring to FIG. 3, there is shown a schematic diagram of a geartrain according to a third embodiment of the present invention.

The structure of the third embodiment is the same as that of the second embodiment except that the ring gear R1 and planet carrier Ca1 of the first simple planetary gearset PG1 are respectively connected to the sun gear S2 and ring gear R2 of the second simple planetary gearset PG2, and the combination of the ring gear R1 and S2 of the first and second simple planetary gearsets PG1 and PG2 is variable connected to the ring gear R3 of the third simple planetary gearset PG3.

Fourth Embodiment

Figure 4:
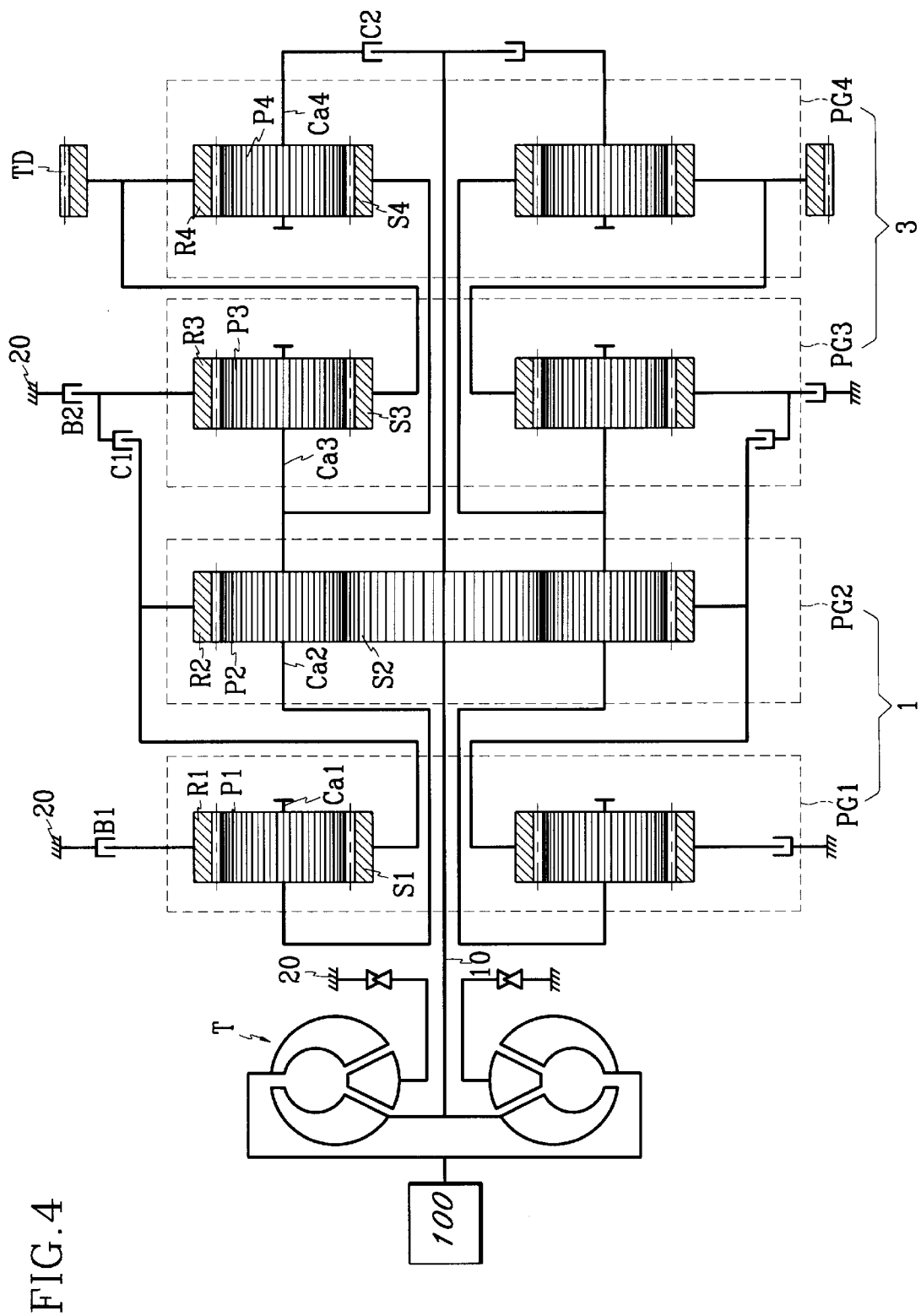
FIG. 4 is a schematic diagram illustrating a geartrain according to a fourth embodiment of the present invention.

Referring to FIG. 4, there is shown a schematic diagram of a geartrain according to a fourth embodiment of the present invention.

The geartrain of this embodiment comprises an engine 100 for generating power, a torque converter T for multiplying torque generated from the engine 100, and first and second compound planetary gear units 1 and 3 for receiving converted torque through an input shaft 10 and for outputting five forward speeds and one reverse speed to a transfer drive gear TD.

The first planetary gear unit 1 comprises first and second simple planetary gearsets PG1 and PG2 each of which is a single pinion planetary gearset.

In the first compound planetary gear unit 1, a planet carrier Ca1 of the first simple planetary gearset PG1 is fixedly connected to a planet carrier Ca2 of the second simple planetary gearset PG2, and a sun gear S1 of the first simple planetary gearset PG1 is fixedly connected to a ring gear R2 of the second simple planetary gearset PG2.

Therefore, the first compound planetary gear unit 1 consists of four operating elements, i.e., a ring gear R1 of the first simple planetary gearset PG1, a sun gear S2 of the second simple planetary gearset PG2, a combination of the planet carriers Ca1 and Ca2 of the first and second simple planetary gearsets PG1 and PG2, and a combination of the sun gear S1 and ring gear R2 of the first and second simple planetary gearsets PG1 and PG2.

The ring gear R1 of the first simple planetary gearset PG1 is variably connected to the transmission housing 20 by a first brake B1, and the sun gear S2 of the second simple planetary gearset PG2 is fixed around the input shaft 10 so as to act as an input element.

With regard to the second compound planetary gear unit 2, since the structure thereof according to this embodiment is the same as that of the first embodiment, the detailed description thereof will be omitted herein and incorporated as a reference.

The above described first and second compound planetary gear units 1 and 3 are combined to each other. That is, the combination of the sun gear S1 and ring gear R2 of the first and second simple planetary gearsets PG1 and PG2 is variably connected to the ring gear R3 of the third simple planetary gearset PG3; the combination of the planet carriers Ca1 and Ca2 of the first and second simple planetary gearsets PG1 and PG2 is fixedly connected to the combination of the planet carrier Ca3 and sun gear S4 of the third and fourth simple planetary gearsets PG3 and PG4; and the sun gear S2 of the second simple planetary gearset PG2 is variably connected to the planet carrier Ca4 of the fourth simple planetary gearset PG4. The combination of the sun gear S3 and ring gear R4 of the third and fourth simple planetary gearsets PG3 and PG4 is connected to the transfer drive gear TD to act as an output element.

A first clutch C1 is interposed between the combination of the sun gear S1 and ring gear R2 of the first and second simple planetary gearsets PG1 and PG2 and the ring gear R3 of the third simple planetary gearset PG3. A second clutch C2 is interposed between the sun gear S2 of the second simple planetary gearset PG2 and the planet carrier Ca4 of the fourth simple planetary gearset PG4.

The above described geartrain can be illustrated as a lever representation as shown in FIG. 8. In FIG. 8, levers L1 and L2 indicate the first and second compound planetary gear units 1 and 3, respectively. The four operating elements of the first compound planetary gear units 1 are indicated as first, second, third and fourth operating elements A, D, E and F on the first lever L1, and the four operating elements of the second compound planetary gear unit 3 are indicated as first, second, third and fourth operating elements G, H, I and J on the second lever L2.

Describing the first lever L1 more in detail, the first operating element A indicates the sun gear S2 of the second simple planetary gearset PG2, the second operating element D indicates the ring gear R1 of the first simple planetary gearset PG2, the third operating element E indicates the combination of the planet carriers Ca1 and Ca2 of the first and second simple planetary gearsets PG1 and PG2, and the fourth operating element F indicates the combination of the sun gear S1 and ring gear R2 of the first and second simple planetary gearsets PG1 and PG2.

Since the operating elements of the second lever L2 are the same as those of the first embodiment, the detailed description thereof will be omitted and incorporated herein as a reference.

The detailed description of shift ratios through the lever analogy will be omitted herein as the shift ratios are the same as those of the first embodiment.

Fifth Embodiment

Figure 5:
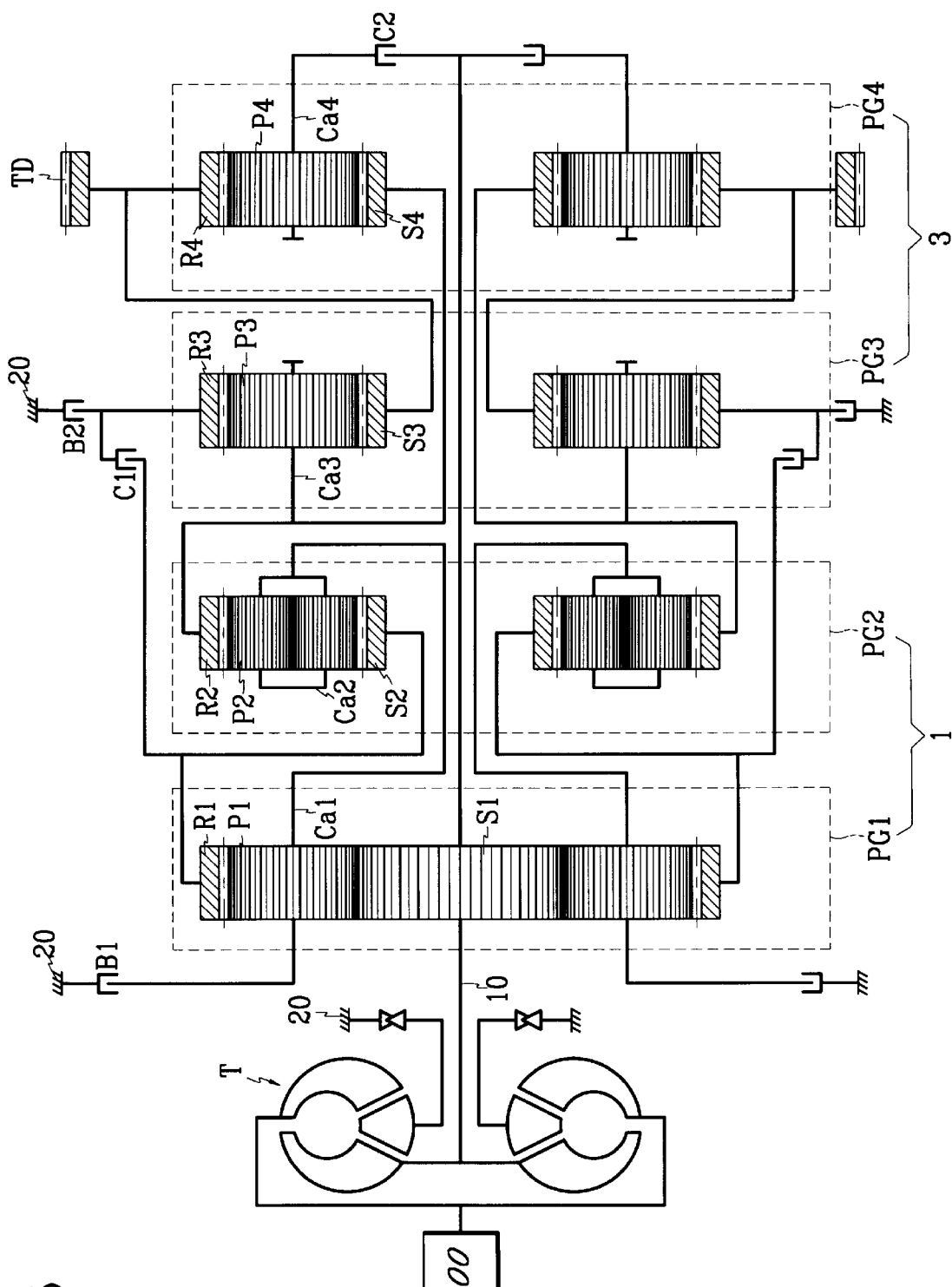
FIG. 5 is a schematic diagram illustrating a geartrain according to a fifth embodiment of the present invention.

Referring to FIG. 5, there is shown a schematic diagram of a geartrain according to a fifth embodiment of the present invention.

The geartrain of this embodiment comprises an engine 100 for generating power, a torque converter T for multiplying torque generated from the engine 100, and first and second compound planetary gear units 1 and 3 for receiving converted torque through an input shaft 10 and for outputting five forward speeds and one reverse speed to a transfer drive gear TD.

The first simple planetary gear unit 1 comprises a first simple planetary gearset PG1 which is a single pinion planetary gearset and a second simple planetary gearset PG2 which is a double pinion planetary gearset.

In the first compound planetary gear unit 1, a planet carrier Ca1 of the first simple planetary gearset PG1 is fixedly connected to a planet carrier Ca2 of the second simple planetary gearset PG2, and a ring gear R1 of the first simple planetary gearset PG1 is fixedly connected to a sun gear S2 of the second simple planetary gearset PG2.

Therefore, the first compound planetary gear unit 1 consists of four operating elements, i.e., a sun gear S1 of the first simple planetary gearset PG1, a ring gear R2 of the second simple planetary gearset PG2, a combination of the planet carriers Ca1 and Ca2 of the first and second simple planetary gearsets PG1 and PG2, and a combination of the ring gear R1 and sun gear S2 of the first and second simple planetary gearsets PG1 and PG2.

The planet carrier Ca1 of the first simple planetary gearset PG1 is variably connected to the transmission housing 20 by a first brake B1, and the sun gear S1 of the first simple planetary gearset PG2 is fixed around the input shaft 10 so as to act as an input element.

With regard to the second compound planetary gear unit 3, since the structure thereof according to this embodiment is the same as that of the first embodiment, the detailed description thereof will be omitted herein and incorporated as a reference.

The above described first and second compound planetary gear units 1 and 3 are combined to each other. That is, the combination of the ring gear R1 and sun gear S2 of the first and second simple planetary gearsets PG1 and PG2 is variably connected to the ring gear R3 of the third simple planetary gearset PG3; the ring gear R2 of the second simple planetary gearset PG2 is fixedly connected to the combination of the planet carrier Ca3 and sun gear S4 of the third and fourth simple planetary gearsets PG3 and PG4; and the sun gear S1 of the first simple planetary gearset PG1 is variably connected to the planet carrier Ca4 of the fourth simple planetary gearset PG4. The combination of the sun gear S3 and ring gear R4 of the third and fourth simple planetary gearsets PG3 and PG4 is connected to the transfer drive gear TD to act as an output element.

A first clutch C1 is interposed between the combination of the ring gear R1 and sun gear S2 of the first and second simple planetary gearsets PG1 and PG2 and the ring gear R3 of the third simple planetary gearset PG3. A second clutch C2 is interposed between the sun gear S1 of the first simple planetary gearset PG1 and the planet carrier Ca4 of the fourth simple planetary gearset PG4.

The above described geartrain can be illustrated as a lever representation as shown in FIG. 8. In FIG. 8, levers L1 and L2 indicate the first and second compound planetary gear units 1 and 3, respectively. The four operating elements of the first compound planetary gear units 1 are indicated as first, second, third and fourth operating elements A, D, E and F on the first lever L1, and the four operating elements of the second compound planetary gear unit 3 are indicated as first, second, third and fourth operating elements G, H, I and J on the second lever L2.

Describing the first lever L1 more in detail, the first operating element A indicates the sun gear S1 of the first simple planetary gearset PG1, the second operating element D indicates the combination of the planet carriers Ca1 and Ca2 of the first and second simple planetary gearsets PG1 and PG2, the third operating element E indicates the ring gear R2 of the second simple planetary gearset PG2, and the fourth operating element F indicates the combination of the ring gear R1 and sun gear S2 of the first and second simple planetary gearsets PG1 and PG2.

Since the operating elements of the second lever L2 are the same as those of the first embodiment, the detailed description thereof will be omitted and incorporated herein as a reference.

The detailed description of shift ratios through the lever analogy will be omitted herein as the shift ratios are the same as those of the first embodiment.

Sixth Embodiment

Figure 6:
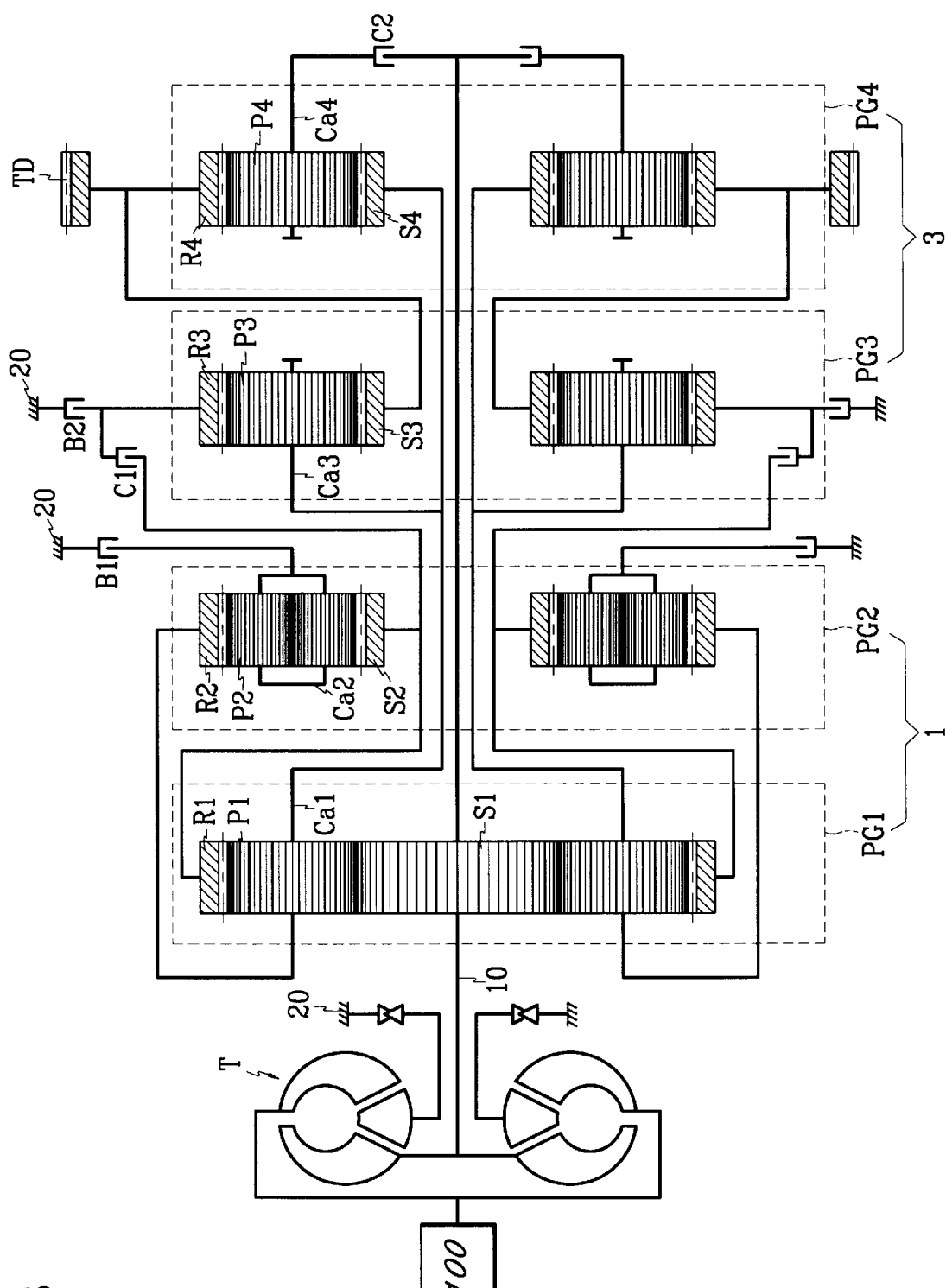
FIG. 6 is a schematic diagram illustrating a geartrain according to a sixth embodiment of the present invention.

Referring to FIG. 6, there is shown a schematic diagram of a geartrain according to a sixth embodiment of the present invention.

The geartrain of this embodiment comprises an engine 100 for generating power, a torque converter T for multiplying torque generated from the engine 100, and first and second compound planetary gear units 1 and 3 for receiving converted torque through an input shaft 10 and for outputting five forward speeds and one reverse speed to a transfer drive gear TD.

The first planetary gear unit 1 comprises a first simple planetary gearset PG1 which is a single pinion planetary gearset and a second simple planetary gearset PG2 which is a double pinion planetary gearset.

In the first compound planetary gear unit 1, a planet carrier Ca1 of the first simple planetary gearset PG1 is fixedly connected to a ring gear R2 of the second simple planetary gearset PG2, and a ring gear R1 of the first simple planetary gearset PG1 is fixedly connected to a sun gear S2 of the second simple planetary gearset PG2.

Therefore, the first compound planetary gear unit 1 consists of four operating elements, i.e., a sun gear S1 of the first simple planetary gearset PG1, a planet carrier Ca2 of the second simple planetary gearset PG2, a combination of the planet carrier Ca1 and ring gear R2 of the first and second simple planetary gearsets PG1 and PG2, and a combination of the ring gear R1 and sun gear S2 of the first and second simple planetary gearsets PG1 and PG2.

The planet carrier Ca2 of the second simple planetary gearset PG2 is variably connected to the transmission housing 20 by a first brake B1, and the sun gear S1 of the first simple planetary gearset PG1 is fixed around the input shaft 10 so as to act as an input element.

With regard to the second compound planetary gear unit 3, since the structure thereof according to this embodiment is the same as that of the first embodiment, the detailed description thereof will be omitted and incorporated as a reference.

The above described first and second compound planetary gear units 1 and 3 are combined to each other. That is, the combination of the ring gear R1 and sun gear S2 of the first and second simple planetary gearsets PG1 and PG2 is variably connected to the ring gear R3 of the third simple planetary gearset PG3; the combination of the planet carrier Ca1 and ring gear R2 of the first and second simple planetary gearsets PG1 and PG2 is fixedly connected to the combination of the planet carrier Ca3 and sun gear S4 of the third and fourth simple planetary gearsets PG3 and PG4; and the sun gear S1 of the first simple planetary gearset PG1 is variably connected to the planet carrier Ca4 of the fourth simple planetary gearset PG4.

A first clutch C1 is interposed between the combination of the ring gear R1 and sun gear S2 of the first and second simple planetary gearsets PG1 and PG2 and the ring gear R3 of the third simple planetary gearset PG3. A second clutch C2 is interposed between the sun gear S1 of the first simple planetary gearset PG1 and the planet carrier Ca4 of the fourth simple planetary gearset PG4.

The above described geartrain can be illustrated as a lever representation as shown in FIG. 8. In FIG. 8, levers L1 and L2 indicate the first and second compound planetary gear units 1 and 3, respectively. The four operating elements of the first compound planetary gear units 1 are indicated as first, second, third and fourth operating elements A, D, E and F on the first lever L1, and the four operating elements of the second compound planetary gear unit 3 are indicated as first, second, third and fourth operating elements G, H, I and J on the second lever L2.

Describing the first lever L1 more in detail, the first operating element A indicates the sun gear S1 of the first simple planetary gearset PG1, the second operating element D indicates the planet carrier Ca2 of the second simple planetary gearset PG2, the third operating element E indicates the combination of the planet carrier Ca1 and ring gear R2 of the first and second simple planetary gearsets PG1 and PG2, and the fourth operating element F indicates the combination of the ring gear R1 and sun gear S2 of the first and second simple planetary gearsets PG1 and PG2.

Since the operating elements of the second lever L2 are the same as those of the first embodiment, the detailed description thereof will be omitted and incorporated herein as a reference.

The detailed description of shift ratios through the lever analogy will be omitted herein as the shift ratios are the same as those of the first embodiment.

Seventh Embodiment

Figure 7:
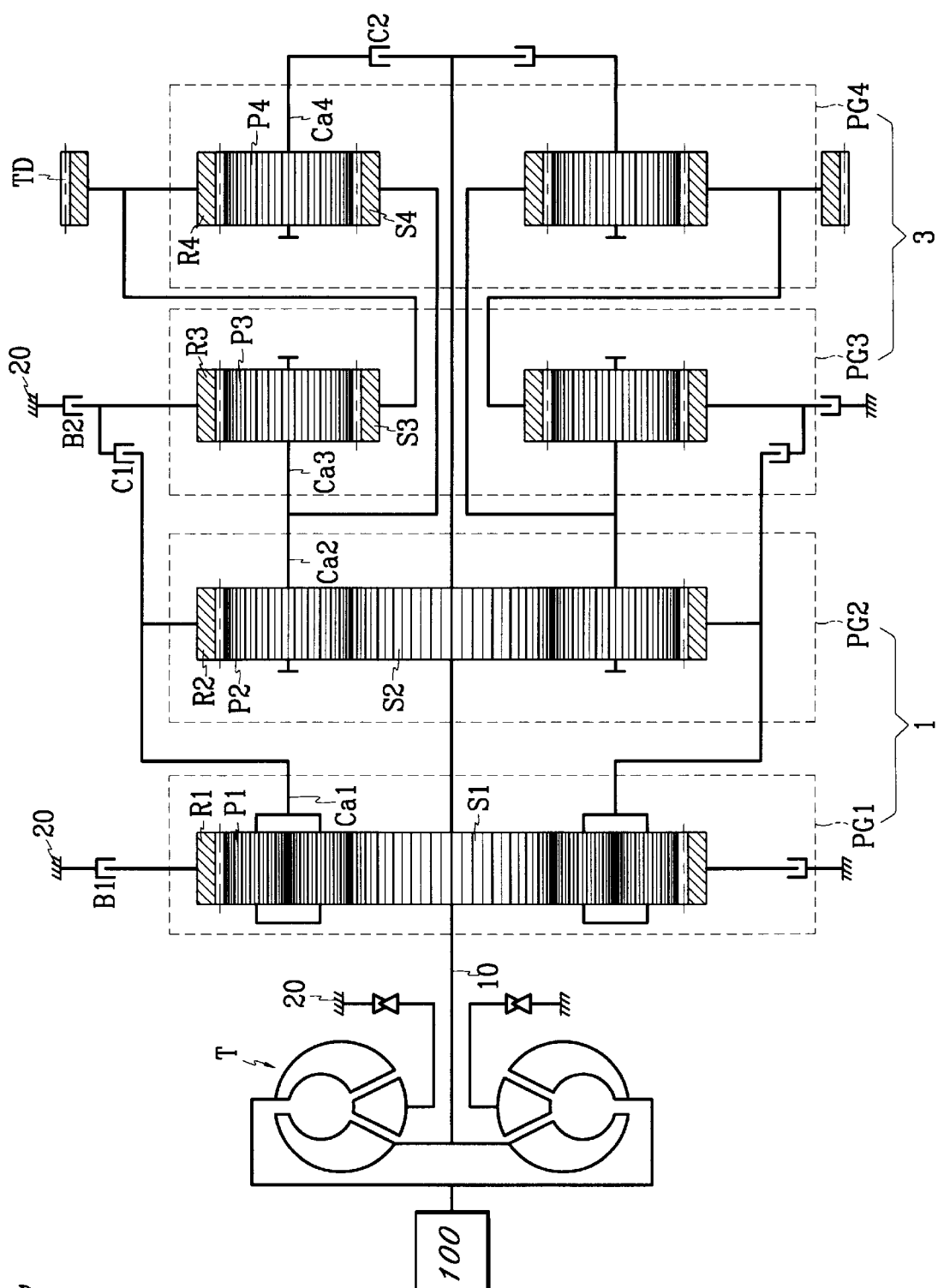
FIG. 7 is a schematic diagram illustrating a geartrain according to a seventh embodiment of the present invention.

Referring to FIG. 7, there is shown a schematic diagram of a geartrain according to a seventh embodiment of the present invention.

The geartrain of this embodiment comprises an engine 100 for generating power, a torque converter T for multiplying torque generated from the engine 100, and first and second compound planetary gear units 1 and 3 for receiving converted torque through an input shaft 10 and for outputting five forward speeds and one reverse speed to a transfer drive gear TD.

The first planetary gear unit 1 comprises a first simple planetary gearset PG1 which is a double pinion planetary gearset and a second simple planetary gearset PG2 which is a single pinion planetary gearset.

In the first compound planetary gear unit 1, a sun gear S1 of the first simple planetary gearset PG1 is fixedly connected to a sun gear S2 of the second simple planetary gearset PG2, and a planet carrier Ca1 of the first simple planetary gearset PG1 is fixedly connected to a ring gear R2 of the second simple planetary gearset PG2.

Therefore, the first compound planetary gear unit 1 consists of four operating elements, i.e., a ring gear R1 of the first simple planetary gearset PG1, a planet carrier Ca2 of the second simple planetary gearset PG2, a combination of the sun gears S1 and S2 of the first and second simple planetary gearsets PG1 and PG2, and a combination of the planet carrier Ca1 and ring gear R2 of the first and second simple planetary gearsets PG1 and PG2.

The ring gear R1 of the first simple planetary gearset PG1 is variably connected to the transmission housing 20 by a first brake B1, and the combination of the sun gears S1 and S2 of the first and second simple planetary gearsets PG1 and PG2 is fixed around the input shaft 10 so as to act as an input element.

With regard to the second compound planetary gear unit 3, since the structure thereof according to this embodiment is the same as that of the first embodiment, the detailed description thereof will be omitted herein and incorporated as a reference.

The above described first and second compound planetary gear units 1 and 3 are combined to each other. That is, the combination of the planet carrier Ca1 and ring gear R2 of the first and second simple planetary gearsets PG1 and PG2 is variably connected to the ring gear R3 of the third simple planetary gearset PG3; the planet carrier Ca2 of the second simple planetary gearset PG2 is fixedly connected to the combination of the planet carrier Ca3 and sun gear S4 of the third and fourth simple planetary gearsets PG3 and PG4; and the combination of the sun gears S1 and S2 of the first and second simple planetary gearsets PG1 and PG2 is variably connected to the planet carrier Ca4 of the fourth simple planetary gearset PG4.

A first clutch C1 is interposed between the combination of the planet carrier Ca1 and ring gear R2 of the first and second simple planetary gearsets PG1 and PG2 and the ring gear R3 of the third simple planetary gearset PG3. A second clutch C2 is interposed between the combination of the sun gears S1 and S2 of the first and second simple planetary gearsets PG1 and PG2 and the planet carrier Ca4 of the fourth simple planetary gearset PG4.

The above described geartrain can be illustrated as a lever representation as shown in FIG. 8. In FIG. 8, levers L1 and L2 indicate the first and second compound planetary gear units 1 and 3, respectively. The four operating elements of the first compound planetary gear units 1 are indicated as first, second, third and fourth operating elements A, D, E and F on the first lever L1, and the four operating elements of the second compound planetary gear unit 3 are indicated as first, second, third and fourth operating elements G, H, I and J on the second lever L2.

Describing the first lever L1 more in detail, the first operating element A indicates the combination of the sun gears S1 and S2 of the first and second simple planetary gearsets PG1 and PG2, the second operating element D indicates the ring gear R1 of the first simple planetary gearset PG1, the third operating element E indicates the planet carrier Ca2 of the second simple planetary gearset PG2, and the fourth operating element F indicates the combination of the planet carrier Ca1 and ring gear R2 of the first and second simple planetary gearsets PG1 and PG2.

Since the operating elements of the second lever L2 are the same as those of the first embodiment, the detailed description thereof will be omitted and incorporated herein as a reference.

The detailed description of shift ratios through the lever analogy will be omitted herein as the shift ratios are the same as those of the first embodiment.

In this disclosure, there is shown and described only the preferred embodiments of the invention, as aforementioned, it is to be understood that the invention is capable of use in various other combinations and environments and is capable of change or modification within the scope of the inventive concepts as expressed herein.

What is claimed is:

1. A geartrain for a five-speed automatic transmission, comprising:

a first compound planetary gear unit comprising first and second simple planetary gearsets having first, second, third and fourth operating elements, said first operating element acting as an input element;

a second compound planetary gear unit comprising third and fourth simple planetary gearsets having fifth, sixth, seventh and eighth operating elements, said fifth operating element acting as an output element, said sixth and eighth operating elements being variably connected to said first and fourth operating elements, respectively, and said seventh operating element being fixedly connected to the third operating element;

clutch means for variably connecting said sixth and eighth operating elements to said first and fourth operating elements, respectively; and brake means for selectively connecting the second and eighth operating elements to a transmission housing.

2. A geartrain of claim 1, wherein each of said first and second simple planetary gearsets is a single pinion planetary gearset.

3. A geartrain of claim 2, wherein the first operating element is a combination of a sun gear of the first simple planetary gearset and a sun gear of the second simple planetary gearset;

the second operating element is a planet carrier of the first simple planetary gearset;

the third operating element is a planet carrier of the second simple planetary gearset; and the fourth operating element is a combination of a ring gear of the first simple planetary gearset and a ring gear of the second simple planetary gearset.

4. A geartrain of claim 3, wherein each of the third and fourth planetary gearsets is a single pinion planetary gearset.

5. A geartrain of claim 4, wherein the fifth operating element is a combination of a sun gear of the third simple planetary gearset and a ring gear of the fourth simple planetary gearset;

the sixth operating element is a planet carrier of the fourth simple planetary gearset;

the seventh operating element is a planet carrier of the third simple planetary gearset and a sun gear of the fourth simple planetary gearset; and the eighth operating element is a ring gear of the third simple planetary gearset.

6. A geartrain of claim 5, wherein the clutch means comprises a first clutch interposed between the combination of the ring gears of the first and second simple planetary gearsets and the ring gear of the third simple planetary gearset.

7. A geartrain of claim 5, wherein the brake means comprises a first brake interposed between the planet carrier of the first simple planetary gearset and the transmission housing and a second brake interposed between the ring gear of the third simple planetary gearset and the transmission housing.

8. A geartrain of claim 2, wherein the first operating element is a sun gear of the first simple planetary gearset;

the second operating element is a planet carrier of the first simple planetary gearset;

the third operating element is a planet carrier of the second simple planetary gearset; and the fourth operating element is a combination of a ring gear of the first simple planetary gearset and a ring gear and sun gear of the second simple planetary gearset.

9. A geartrain of claim 8, wherein each of the third and fourth planetary gearsets is a single pinion planetary gearset.

10. A geartrain of claim 9, wherein the fifth operating element is a combination of a sun gear of the third simple planetary gearset and a ring gear of the fourth simple planetary gearset;

the sixth operating element is a planet carrier of the fourth simple planetary gearset;

the seventh operating element is a combination of a planet carrier of the third simple planetary gearset and a sun gear of the fourth simple planetary gearset; and the eighth operating element is a ring gear of the third simple planetary gearset.

11. A geartrain of claim 10, wherein the clutch means comprises a first clutch interposed between the sun gear of the first simple planetary gearset and the planet carrier of the fourth simple planetary gearset, and a second clutch interposed between the combination of the ring gear of the first simple planetary gearset and the ring and sun gears of the second simple planetary gearset and the ring gear of the third simple planetary gearset.

12. A geartrain of claim 10, wherein the brake means comprises a first brake interposed between the planet carrier of the first simple planetary gearset and the transmission housing and a second brake interposed between the ring gear of the third simple planetary gearset and the transmission housing.

13. A geartrain of claim 2, wherein the first operating element is a sun gear of the first simple planetary gearset;

the second operating element is a combination of a planet carrier of the first simple planetary gearset and a ring gear of the second simple planetary gearset;

the third operating element is a planet carrier of the second simple planetary gearset; and the fourth operating element is a combination of a ring gear of the first simple planetary gearset and a sun gear of the second simple planetary gearset.

14. A geartrain of claim 13, wherein each of the third and fourth planetary gearsets is a single pinion planetary gearset.

15. A geartrain of claim 14, wherein the fifth operating element is a combination of a sun gear of the third simple planetary gearset and a ring gear of the fourth simple planetary gearset;

the sixth operating element is a planet carrier of the fourth simple planetary gearset;

the seventh operating element is a combination of a planet carrier of the third simple planetary gearset and a sun gear of the fourth simple planetary gearset; and the eighth operating element is a ring gear of the third simple planetary gearset.

16. A geartrain of claim 15, wherein the clutch means comprises a first clutch interposed between the sun gear of the first simple planetary gearset and the planet carrier of the fourth simple planetary gearset, and a second clutch interposed between the combination of the ring gear of the first simple planetary gearset and the sun gear of the second simple planetary gearset and the ring gear of the third simple planetary gearset.

17. A geartrain of claim 15, wherein the brake means comprises a first brake interposed between the combination of the planet carrier of the first simple planetary gearset and the ring gear of the second simple planetary gearset and the transmission housing, and a second brake interposed between the ring gear of the third simple planetary gearset and the transmission housing.

18. A geartrain of claim 2, wherein the first operating element is a sun gear of the second simple planetary gearset;

the second operating element is a ring gear of the first simple planetary gearset;

the third operating element is a combination of a planet carrier of the first simple planetary gearset and a planet carrier of the second simple planetary gearset; and the fourth operating element is a combination of a sun gear of the first simple planetary gearset and a ring gear of the second simple planetary gearset.

19. A geartrain of claim 18, wherein each of the third and fourth planetary gearsets is a single pinion planetary gearset.

20. A geartrain of claim 19, wherein the fifth operating element is a combination of a sun gear of the third simple planetary gearset and a ring gear of the fourth simple planetary gearset;

the sixth operating element is a planet carrier of the fourth simple planetary gearset;

the seventh operating element is a combination of a planet carrier of the third simple planetary gearset and a sun gear of the fourth simple planetary gearset; and the eighth operating element is a ring gear of the third simple planetary gearset.

21. A geartrain of claim 20, wherein the clutch means comprises a first clutch interposed between the sun gear of the second simple planetary gearset and the planet carrier of the fourth simple planetary gearset, and a second clutch interposed between the combination of the sun gear of the first simple planetary gearset and the ring gear of the second simple planetary gearset and the ring gear of the third simple planetary gearset.

22. A geartrain of claim 20, wherein the brake means comprises a first brake interposed between the ring gear of the first simple planetary gearset and the transmission housing, and a second brake interposed between the ring gear of the third simple planetary gearset and the transmission housing.

23. A geartrain of claim 1, wherein the first simple planetary gearset is a single pinion planetary gearset and the second simple planetary gearset is a double pinion planetary gearset.

24. A geartrain of claim 23, wherein the first operating element is a sun gear of the first simple planetary gearset;

the second operating element is a combination of a planet carrier of the first simple planetary gearset and a planet carrier of the second simple planetary gearset;

the third operating element is a ring gear of the second simple planetary gearset; and the fourth operating element is a combination of a ring gear of the first simple planetary gearset and a sun gear of the second simple planetary gearset.

25. A geartrain of claim 24, wherein each of the third and fourth planetary gearsets is a single pinion planetary gearset.

26. A geartrain of claim 25, wherein the fifth operating element is a combination of a sun gear of the third simple planetary gearset and a ring gear of the fourth simple planetary gearset;

the sixth operating element is a planet carrier of the fourth simple planetary gearset;

the seventh operating element is a combination of a planet carrier of the third simple planetary gearset and a sun gear of the fourth simple planetary gearset; and the eighth operating element is a ring gear of the third simple planetary gearset.

27. A geartrain of claim 26, wherein the clutch means comprises a first clutch interposed between the sun gear of the first simple planetary gearset and the planet carrier of the fourth simple planetary gearset, and a second clutch interposed between the combination of the ring gear of the first simple planetary gearset and the sun gear of the second simple planetary gearset and the ring gear of the third simple planetary gearset.

28. A geartrain of claim 26, wherein the brake means comprises a first brake interposed between the combination of the planet carrier of the first simple planetary gearset and the planet carrier of the second simple planetary gearset and the transmission housing, and a second brake interposed between the ring gear of the third simple planetary gearset and the transmission housing.

29. A geartrain of claim 23, wherein the first operating element is a sun gear of the first simple planetary gearset;

the second operating element is a planet carrier of the second simple planetary gearset;

the third operating element is a combination of a planet carrier of the first simple planetary gearset and a ring gear of the second simple planetary gearset; and the fourth operating element is a combination of a ring gear of the first simple planetary gearset and a sun gear of the second simple planetary gearset.

30. A geartrain of claim 29, wherein each of the third and fourth planetary gearsets is a single pinion planetary gearset.

31. A geartrain of claim 30, wherein the fifth operating element is a combination of a sun gear of the third simple planetary gearset and a ring gear of the fourth simple planetary gearset;

the sixth operating element is a planet carrier of the fourth simple planetary gearset;

the seventh operating element is a combination of a planet carrier of the third simple planetary gearset and a sun gear of the fourth simple planetary gearset; and the eighth operating element is a ring gear of the third simple planetary gearset.

32. A geartrain of claim 31, wherein the clutch means comprises a first clutch interposed between the sun gear of the first simple planetary gearset and the planet carrier of the fourth simple planetary gearset, and a second clutch interposed between the combination of the ring gear of the first simple planetary gearset and the sun gear of the second simple planetary gearset and the ring gear of the third simple planetary gearset.

33. A geartrain of claim 31, wherein the brake means comprises a first brake interposed between the planet carrier of the second simple planetary gearset and the transmission housing, and a second brake interposed between the ring gear of the third simple planetary gearset and the transmission housing.

34. A geartrain of claim 23, wherein the first operating element is a combination of a sun gear of the first simple planetary gearset and a sun gear of the second simple planetary gearset;

the second operating element is a ring gear of the first simple planetary gearset;

the third operating element is a planet carrier of the second simple planetary gearset; and the fourth operating element is a combination of a planet carrier of the first simple planetary gearset and a ring gear of the second simple planetary gearset.

35. A geartrain of claim 34, wherein each of the third and fourth planetary gearsets is a single pinion planetary gearset.

36. A geartrain of claim 30, wherein the fifth operating element is a combination of a sun gear of the third simple planetary gearset and a ring gear of the fourth simple planetary gearset;

the sixth operating element is a planet carrier of the fourth simple planetary gearset;

the seventh operating element is a combination of a planet carrier of the third simple planetary gearset and a sun gear of the fourth simple planetary gearset; and the eighth operating element is a ring gear of the third simple planetary gearset.

37. A geartrain of claim 31, wherein the clutch means comprises a first clutch interposed between the combination of the sun gear of the first simple planetary gearset and the planet carrier of the fourth simple planetary gearset, and a second clutch interposed between the combination of the planet carrier of the first simple planetary gearset and the ring gear of the second simple planetary gearset and the ring gear of the third simple planetary gearset.

38. A geartrain of claim 26, wherein the brake means comprises a first brake interposed between the ring gear of the second simple planetary gearset and the transmission housing, and a second brake interposed between the ring gear of the third simple planetary gearset and the transmission housing.

* * * * *

UNITED STATES PATENT AND TRADEMARK OFFICE
CERTIFICATE OF CORRECTION

PATENT NO. : 5,928,102
DATED : July 27, 1999
INVENTOR(S) : Jong-Sool Park

It is certified that error appears in the above-identified patent and that said Letters Patent is hereby corrected as shown below:

On the Title Page, Item [75], in the Inventor, line 1, "Suwon-si" should read --Suwon--.

Signed and Sealed this

Twenty-second Day of February, 2000

Attest:

Q. TODD DICKINSON

Attesting Officer

Commissioner of Patents and Trademarks